United States Patent
Jones et al.

(10) Patent No.: US 11,776,220 B1
(45) Date of Patent: Oct. 3, 2023

(54) LOCALIZATION OF OBJECTS

(71) Applicant: Apple Inc., Cupertino, CA (US)

(72) Inventors: Scott Rick Jones, San Rafael, CA (US); Ronald Vernon Ong Siy, San Francisco, CA (US); Christopher Harlan Paul, Redwood City, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/370,036

(22) Filed: Jul. 8, 2021

Related U.S. Application Data

(60) Provisional application No. 63/053,872, filed on Jul. 20, 2020.

(51) Int. Cl.
*G06F 15/16* (2006.01)
*G06T 19/00* (2011.01)
*H04L 67/306* (2022.01)
*H04W 4/80* (2018.01)
*H04W 4/029* (2018.01)
*H04L 67/52* (2022.01)

(52) U.S. Cl.
CPC .......... *G06T 19/006* (2013.01); *H04L 67/306* (2013.01); *H04L 67/52* (2022.05); *H04W 4/029* (2018.02); *H04W 4/80* (2018.02)

(58) Field of Classification Search
CPC ...... G06T 19/006; H04W 4/029; H04W 4/80; H04L 67/52; H04L 67/306
See application file for complete search history.

(56) References Cited

U.S. PATENT DOCUMENTS

| 9,256,861 | B2 | 2/2016 | Blattner |
| 2003/0119531 | A1 | 6/2003 | Patton et al. |
| 2009/0158170 | A1 | 6/2009 | Narayanan et al. |
| 2011/0148916 | A1* | 6/2011 | Blattner ............... H04L 51/043 345/619 |
| 2020/0410763 | A1* | 12/2020 | Hare ...................... H04L 51/04 |
| 2021/0201899 | A1* | 7/2021 | Edwards ............... G06T 19/006 |

\* cited by examiner

*Primary Examiner* — Normin Abedin
(74) *Attorney, Agent, or Firm* — Fernando & Partners, LLP

(57) ABSTRACT

Various implementations disclosed herein include devices, systems, and methods for modifying a visual property of an object based on a geographic location associated with a device. In some implementations, a method includes obtaining a request to display an object that is associated with a set of one or more visual properties including a visual property that is dependent on a theme. Based on a particular theme, a set of one or more physical elements is identified that corresponds to the object. The one or more physical elements are associated with respective values for the visual property. A value for the visual property associated with the object is determined based on the respective values associated with the set of one or more physical elements. The object is displayed in accordance with the value for the visual property.

26 Claims, 8 Drawing Sheets

LOCALIZATION OF OBJECTS

CROSS-REFERENCE TO RELATED APPLICATION

This application claims the benefit of U.S. Provisional Patent App. No. 63/053,872, filed on Jul. 20, 2020, which is incorporated by reference in its entirety.

TECHNICAL FIELD

The present disclosure generally relates to localization of objects.

BACKGROUND

Some devices are capable of generating and presenting graphical environments that include representations of physical elements. These environments may be presented on mobile communication devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
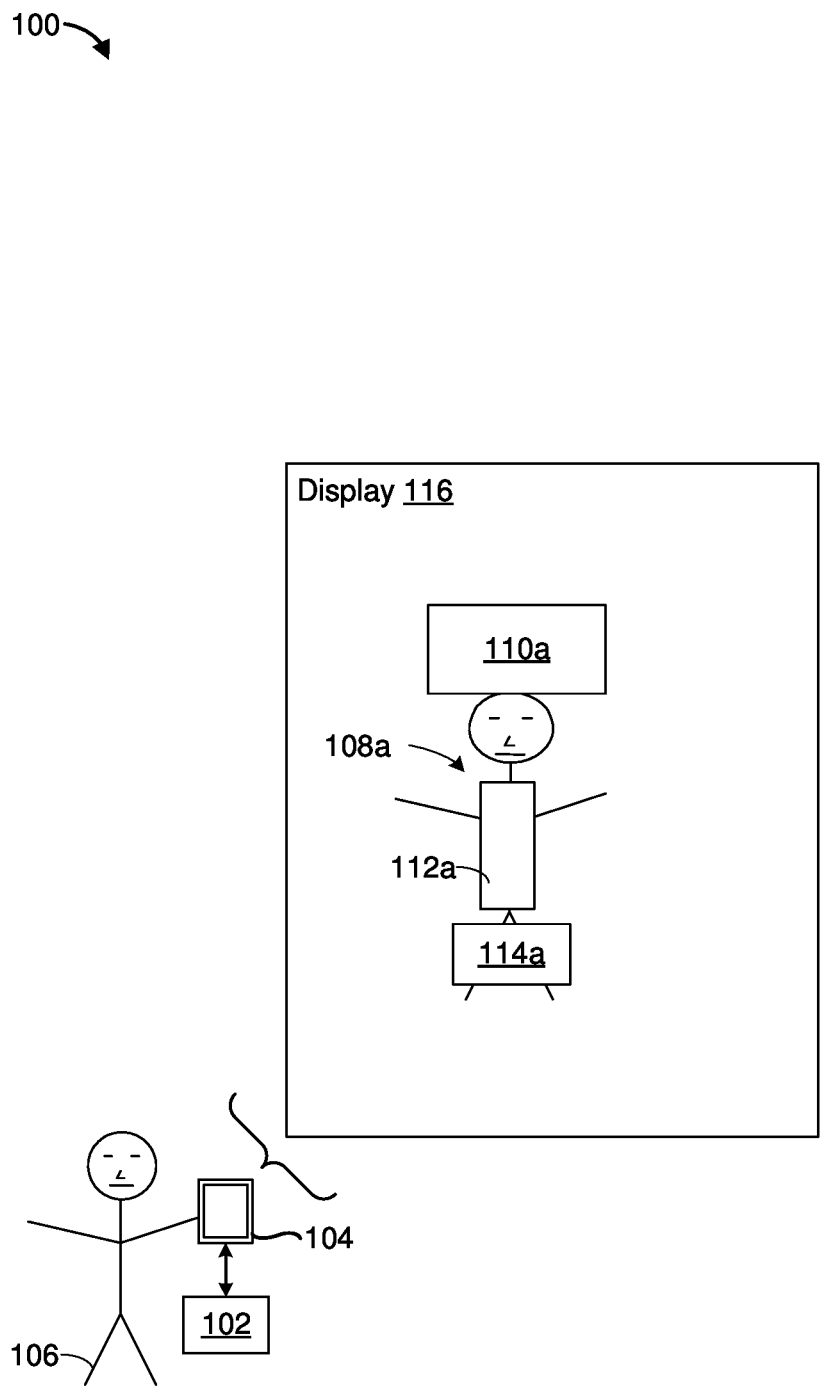
FIGS. 1A and 1B depict exemplary systems for use in various computer-enhanced technologies.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for modifying a visual property of an object based on a geographic location associated with a device. In some implementations, a method includes obtaining a request to display an object that is associated with a set of one or more visual properties including a visual property that is dependent on a theme. Based on a particular theme, a set of one or more physical elements is identified that corresponds to the object. The one or more physical elements are associated with respective values for the visual property. A value for the visual property associated with the object is determined based on the respective values associated with the set of one or more physical elements. The object is displayed in accordance with the value for the visual property.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In various implementations, a visual property of an object is modified based on a theme. The theme may be location dependent. For example, the appearance of the object may be selected based on a geographic region.

In some implementations, the object is associated with one or more visual properties. A visual property may be dependent on a theme. A set of one or more physical elements, such as articles of clothing, accessories, so forth, may be identified based on the theme. The set of one or more physical elements may be associated with respective values for the visual property. A value for the visual property may be determined for the object based on the respective values associated with the set of one or more physical elements. The object may be displayed in accordance with the value for the visual property.

FIG. 1A is a diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 102 and an electronic device 104. In the example of FIG. 1A, the electronic device 104 is being used by a person 106. In some implementations, the electronic device 104 includes a smartphone, a tablet, a laptop, or the like.

As illustrated in FIG. 1A, the electronic device 104 receives a request to display an object. For example, the object may be a person. The object is associated with a set of one or more visual properties, including a visual property that is dependent on a theme. For example, if the object is a representation of a person (e.g., an avatar of a real person or a fictional person, sometimes referred to as a virtual person or a virtual character), the visual property may be an accessory displayed on a face of the representation of the person. In some implementations, a visual property for a virtual character includes a type of clothing article that is displayed as being worn by the virtual character (e.g., a type of headgear, a type of shirt and/or a type of trousers).

In some implementations, the controller 102 and/or the electronic device 104 identify a set of one or more physical elements that corresponds to the object based on a particular theme. For example, if the object is a virtual person, the controller 102 and/or the electronic device 104 may identify articles of clothing, accessories, so forth, that may be worn or carried by real persons. These physical elements are associated with respective values for the visual property. For example, for a "business casual" theme, a pair of pants may be associated with a value for the visual property consistent with a pair of khakis (e.g., the virtual person is shown wearing virtual khakis). For a "formal" theme, the pair of pants may be associated with a value for the visual property consistent with tuxedo pants (e.g., the virtual person is shown wearing virtual tuxedo pants).

In some implementations, the theme is location-based. For example, for a theme corresponding to a first geographic region (e.g., an office), a face of the virtual person may be associated with a value for the visual property consistent with a clean-shaven appearance. For a theme corresponding to a second geographic region (e.g., a house party), the face of the virtual person may be associated with a value for the visual property consistent with a beard.

In some implementations, the controller 102 and/or the electronic device 104 determine a value for the visual property associated with the object based on the respective values associated with the set of one or more physical items. If the object is a virtual person, for example, the controller 102 and/or the electronic device 104 may select the respective appearances of articles of clothing based on a theme. For example, for a theme corresponding to a first geographic region (e.g., a first country, for example, the United States), the controller 102 and/or the electronic device 104 may select a hooded sweatshirt and a baseball cap, and display the virtual person as wearing a virtual hooded sweatshirt and a virtual baseball cap. For a theme corresponding to a second geographic region (e.g., a second country, for example, the United Kingdom), the controller 102 and/or the electronic device 104 may select a blazer and a fedora, and display the virtual person as wearing a virtual blazer and a virtual fedora.

Figure 1B:
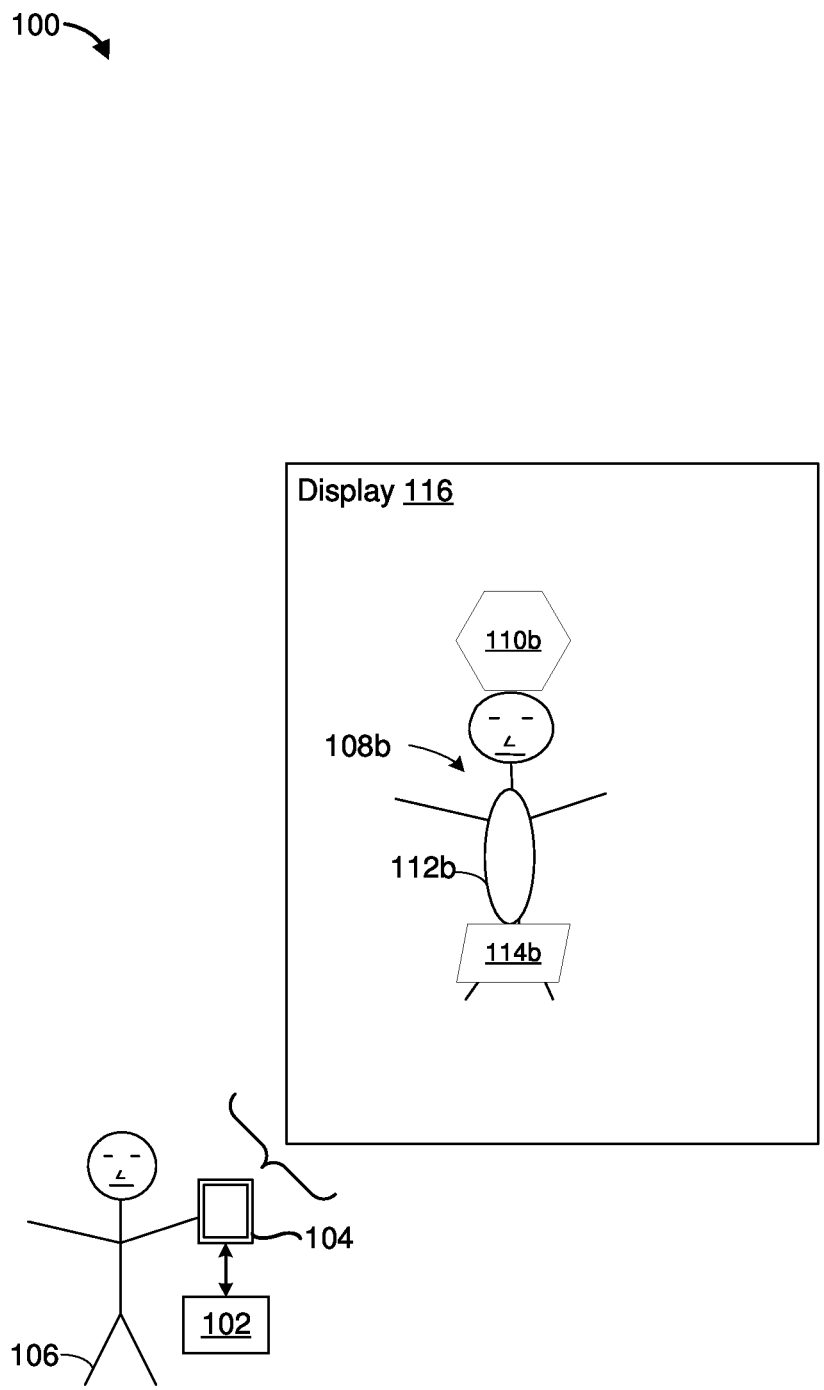

In some implementations, the controller 102 and/or the electronic device 104 display the object in accordance with the value for the visual property. For example, as shown in FIG. 1A, for a theme corresponding to a first geographic region, an object 108a may be displayed with a hat 110a, an upper body article of clothing 112a, and a lower body article of clothing 114a. As shown in FIG. 1B, for a theme corresponding to a second geographic region, an object 108b may be displayed with a hat 110b, an upper body article of clothing 112b, and a lower body article of clothing 114b. The object 108a or the object 108b may be displayed on a display 116. As illustrated in FIG. 1B, the hat 110b, the upper body article of clothing 112b and the lower body article of clothing 114b may be different from the hat 110a, the upper body article of clothing 112b and the lower body article of clothing 114a shown in FIG. 1A. As an example, the hat 110a shown in FIG. 1A may include a virtual baseball cap, whereas the hat 110b shown in FIG. 1B may include a virtual fedora. As another example, the upper body article of clothing 112a shown in FIG. 1A may include a virtual hooded sweatshirt, whereas the upper body article of clothing 112b shown in FIG. 1B may include a virtual blazer. As yet another example, the lower body article of clothing 114a shown in FIG. 1A may include virtual jeans, whereas the lower body article of clothing 114b shown in FIG. 1B may include virtual khakis.

Various techniques discussed herein consider the use of location information to affect visual characteristics. Implementers of such technologies are reminded to inform and obtain a user's permission for using such information. Location information should be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental and industry standards.

It is possible to implement the techniques described herein under an opt-in model, such that a user's informed consent is obtained before their location is used to provide the features contemplated. Settings or other preferences may be adjusted such that users can decide whether to enable the techniques described herein. It is also possible to limit the degree to which location information is obtained and/or used. For instance, locations can be obscured such that, for example, the location information identifies the country but does not identify a precise location of the user.

Figure 2:
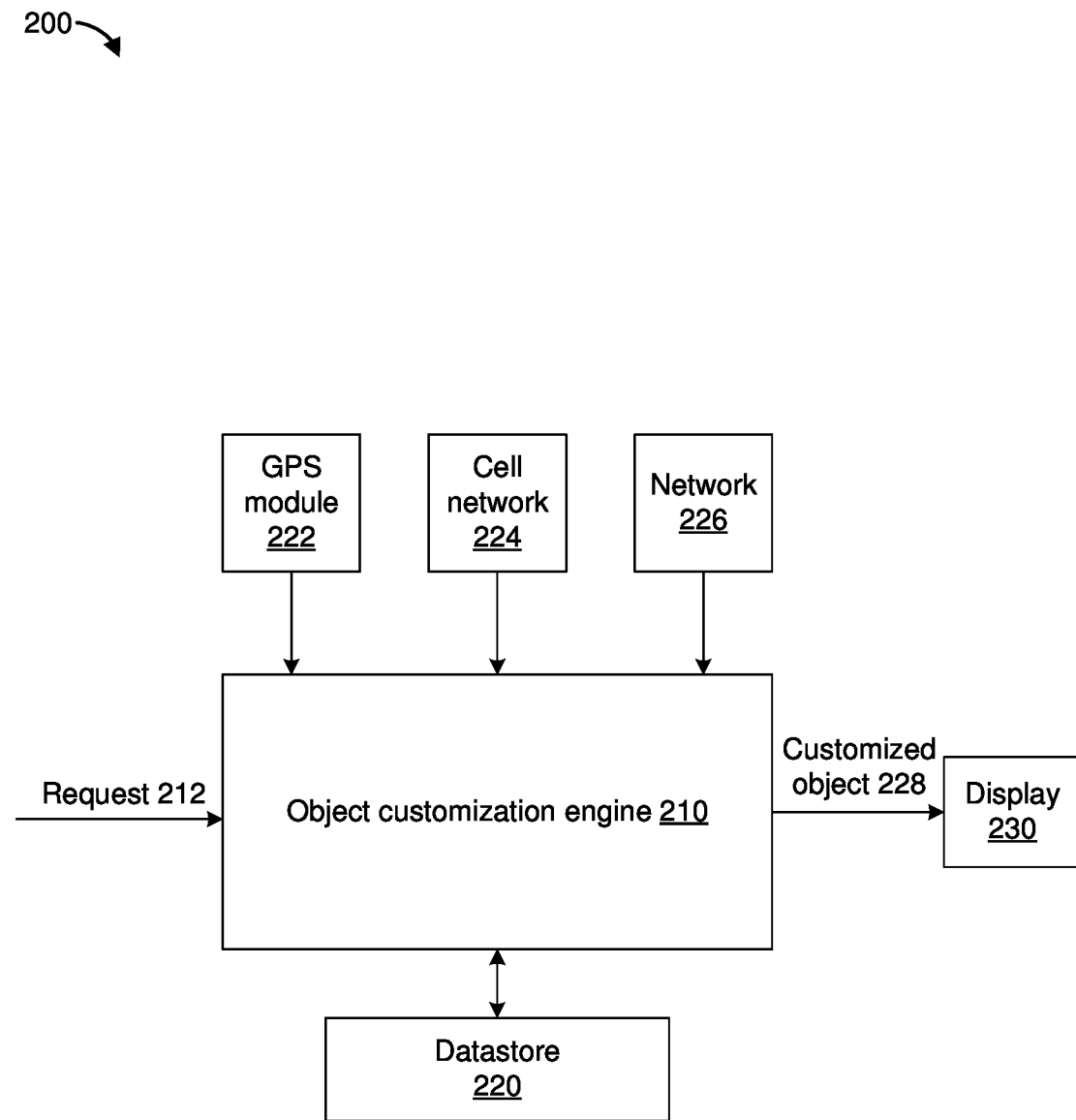
FIG. 2 illustrates an example system that modifies a visual property of an object based on a geographic location associated with a device according to various implementations.

FIG. 2 illustrates an example system 200 that modifies a visual property of an object based on a geographic location associated with a device according to various implementations. In some implementations, the system 200 resides at the controller 102 and/or the electronic device 104 shown in FIGS. 1A and 1B.

In some implementations, an object customization engine 210 obtains a request 212 to display an object. The object may be an XR object (e.g., a graphical object, sometimes referred to as a virtual object). In some implementations, a user provides the request 212 using an input device, such as a keyboard, mouse, microphone, image sensor, pen device, and/or a touchscreen interface, e.g., using the display 116 of FIGS. 1A and 1B.

The object is associated with a set of one or more visual properties including a visual property that is dependent on a theme. For example, if the object is an XR person (e.g., a graphical person, sometimes referred to as a virtual person, a virtual character or an avatar), the object may be associated with visual properties including a hat, an upper body article of clothing, a lower body article of clothing, a carried accessory, and so forth.

In some implementations, the object customization engine 210 identifies a set of one or more physical elements that corresponds to the object. The physical elements may be identified based on a particular theme. For example, if the object is an XR person, the object customization engine 210 may identify the physical elements as a set of clothes including an upper body article of clothing and/or a lower body article of clothing, optional accessories including a hat, eyewear, and/or a carried accessory. In some implementations, particular types of physical elements may be associated with particular themes. For example, for a particular theme corresponding to a first geographic region, the object customization engine 210 may identify a hooded sweatshirt and a baseball cap as members of the set of one or more physical elements. For a particular theme corresponding to a second geographic region, the object customization engine 210 may identify a blazer and a fedora as members of the set of one or more physical elements.

In some implementations, the object customization engine 210 selects the particular theme from a plurality of themes. The plurality of themes may be stored, for example, in a datastore 220. In some implementations, the object customization engine 210 selects the particular theme based on a location that is associated with the electronic device 104. The location may be a registered location of the electronic device 104, e.g., as represented in a profile.

In some implementations, the object customization engine 210 selects the particular theme based on a current location of the electronic device 104. The object customization engine 210 may obtain the current location of the electronic device 104. For example, the object customization engine 210 may obtain the current location of the electronic device 104 from a global positioning system (GPS) module 222. In some implementations, the object customization engine 210 obtains the current location of the electronic device 104 based on a wireless signal, e.g., an identifier from a cellular network 224. In some implementations, the object customization engine 210 obtains the current location of the electronic device 104 based on an identifier from a network 226, such as an Internet Protocol (IP) address. The current location of the electronic device 104 may be resolved to a geographic region, such as a country, state, or province. In some implementations, the current location of the electronic device 104 is resolved to a type of location, such as a school, a place of business, or a residence.

In some implementations, the object customization engine 210 selects the particular theme based on a characteristic of a user. For example, the object customization engine 210 may select the particular theme based on a voice characteristic of the user. An accent, for example, may be resolved to a geographic region.

In some implementations, the object customization engine 210 determines a value for the visual property associated with the object based on the respective values associated with the set of one or more physical elements. For example, the object customization engine 210 may select a value for the visual property that corresponds to an article of clothing that is worn by people in the geographic region. In some implementations, the object customization engine 210 selects a value for the visual property that corresponds to an accessory that is worn or carried by people in the geographic region. In some implementations, the object customization engine 210 selects a value for the visual property that corresponds to a language that is spoken in the geographic region.

In some implementations, the object customization engine 210 displays the object in accordance with the value for the visual property. For example, the object customization engine 210 may output a customized object 228 with the selected value for the visual property to a display 230, which may then display the customized object. In some implementations, the display 230 is integrated into the electronic device 104. In some implementations, the display 230 is an accessory device (e.g., an external display) that is in communication with the controller 102 and/or the electronic device 104 via a wired or wireless connection.

Figure 3:
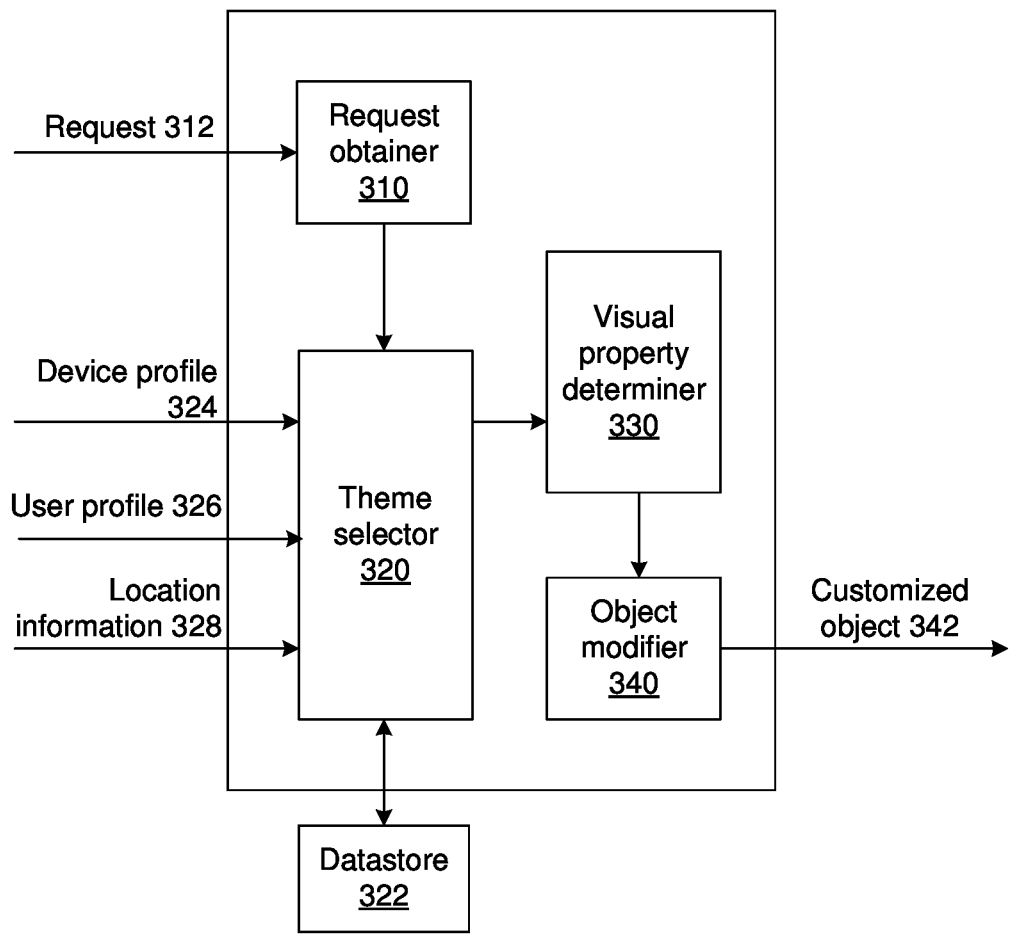
FIG. 3 is a block diagram of an example object customization engine in accordance with some implementations.

FIG. 3 is a block diagram of an example object customization engine 300 in accordance with some implementations. In some implementations, the object customization engine 300 implements the object customization engine 210 shown in FIG. 2. In various implementations, the object customization engine 300 obtains a request to display an object that is associated with one or more visual properties including a visual property that is dependent on a theme, identifies a set of physical elements that corresponds to the object based on a particular theme, determines a value for the visual property of the object based on respective values associated with the physical object, and displays the object in accordance with the value for the visual property.

In some implementations, a request obtainer 310 obtains a request 312 to display an object, such as an XR object. A user may provide the request 312 using an input device, such as a keyboard, mouse, microphone, image sensor, pen device, and/or a touchscreen interface, e.g., using the display 116 of FIGS. 1A and 1B.

In some implementations, the object is associated with one or more visual properties. The visual properties may be dependent on a type of the object. For example, if the object is an XR object representing a person, the object may be associated with visual properties corresponding to articles of clothing and/or accessories that are worn or carried by a person. Examples of visual properties may include, but are not limited to a hat, an upper body article of clothing, a lower body article of clothing, and/or a carried accessory.

In some implementations, a theme selector 320 selects a particular theme to apply to the object. The theme selector 320 may select the particular theme from a plurality of themes that are stored, for example, in a datastore 322. In some implementations, the theme selector 320 selects the particular theme based on a location that is associated with the electronic device 104. The location may be a registered location of the electronic device 104. The registered location may be stored in a device profile 324.

In some implementations, the location is associated with the user, e.g., based on a user profile 326. The electronic device 104 may store multiple user profiles, e.g., corresponding to users associated with different geographic regions. In some implementations, a user may select the user profile 326 from a plurality of user profiles. In some implementations, the theme selector 320 selects the particular theme based on a characteristic of a user. For example, the theme selector 320 may select the particular theme based on a voice characteristic of the user. In some implementations, for example, the theme selector 320 selects a particular theme corresponding to a geographic region based on an accent detected in the user's voice.

In some implementations, the theme selector 320 selects the particular theme based on a current location of the electronic device 104. The theme selector 320 may obtain location information 328 for the electronic device 104. For example, the location information 328 may include information from a global positioning system (GPS) module. In some implementations, the location information 328 includes information encoded in a wireless signal, e.g., an identifier from a cellular network. In some implementations, the location information 328 includes an identifier from a network, such as an Internet Protocol (IP) address. The location information 328 may be resolved to a geographic location, such as a country, state, or province. In some implementations, the location information 328 is resolved to a type of location, such as a school, a place of business, or a residence.

In some implementations, the theme selector 320 selects the particular theme based on a user selection. For example, the user may provide a user input corresponding to a selection of a geographic region using an input device, such as a keyboard, mouse, microphone, image sensor, pen device, and/or a touchscreen interface, e.g., using the display 116 of FIGS. 1A and 1B.

In some implementations, a visual property determiner 330 identifies a set of one or more physical elements that corresponds to the object based on the particular theme and determines a value for the visual property associated with the object based on the identified set of one or more physical elements. For example, if the object is an XR person, the visual property determiner 330 may identify the physical elements as a set of clothes including an upper body article of clothing and/or a lower body article of clothing, optional accessories including a hat, eyewear, and/or a carried accessory that are associated with the particular theme, e.g., worn or carried by persons in a geographic region. For example, for a particular theme corresponding to a first geographic region, the visual property determiner 330 may identify a hooded sweatshirt and a baseball cap as members of the set of one or more physical elements (e.g., when the most common types of upper body article of clothing and headgear are hooded sweatshirts and baseball caps in the first geographic region). For a particular theme corresponding to a second geographic region, the visual property determiner 330 may identify a blazer and a fedora as members of the set of one or more physical elements (e.g., when the most common types of upper body article of clothing and headgear are blazers and fedoras in the second geographic region).

In some implementations, the visual property determiner 330 determines a value for the visual property associated with the object based on the respective values associated with the set of one or more physical elements. For example, the visual property determiner 330 may select a value for the visual property that corresponds to an article of clothing that is worn by people in the geographic region. For a particular theme corresponding to a first geographic region, for example, the visual property determiner 330 may select a value for the visual property that corresponds to a hooded sweatshirt. For a particular theme corresponding to a second geographic region, the visual property determiner 330 may select a value for the visual property that corresponds to a blazer.

In some implementations, the visual property determiner 330 selects a value for the visual property that corresponds to an accessory that is worn or carried by people in the geographic region. For a particular theme corresponding to a first geographic region, for example, the visual property determiner 330 may select a value for the visual property that corresponds to a baseball cap. For a particular theme corresponding to a second geographic region, the visual property determiner 330 may select a value for the visual property that corresponds to a fedora.

In some implementations, the visual property determiner 330 selects a value for the visual property that corresponds to a language that is spoken in the geographic region. For a particular theme corresponding to a first geographic region, for example, the visual property determiner 330 may select a value for the visual property that corresponds to a shirt with a slogan printed in a first language. For a particular theme corresponding to a second geographic region, the visual property determiner 330 may select a value for the visual property that corresponds to a shirt with a slogan printed in a second language.

In some implementations, an object modifier 340 generates a customized object 342 in accordance with the value for the visual property. The object modifier 340 outputs the customized object 342 to a display, which may then display the customized object 342. In some implementations, the display is integrated into the electronic device 104. In some implementations, the display is an accessory device (e.g., an external display) that is in communication with the controller 102 and/or the electronic device 104 via a wired or wireless connection.

Figure 4A:
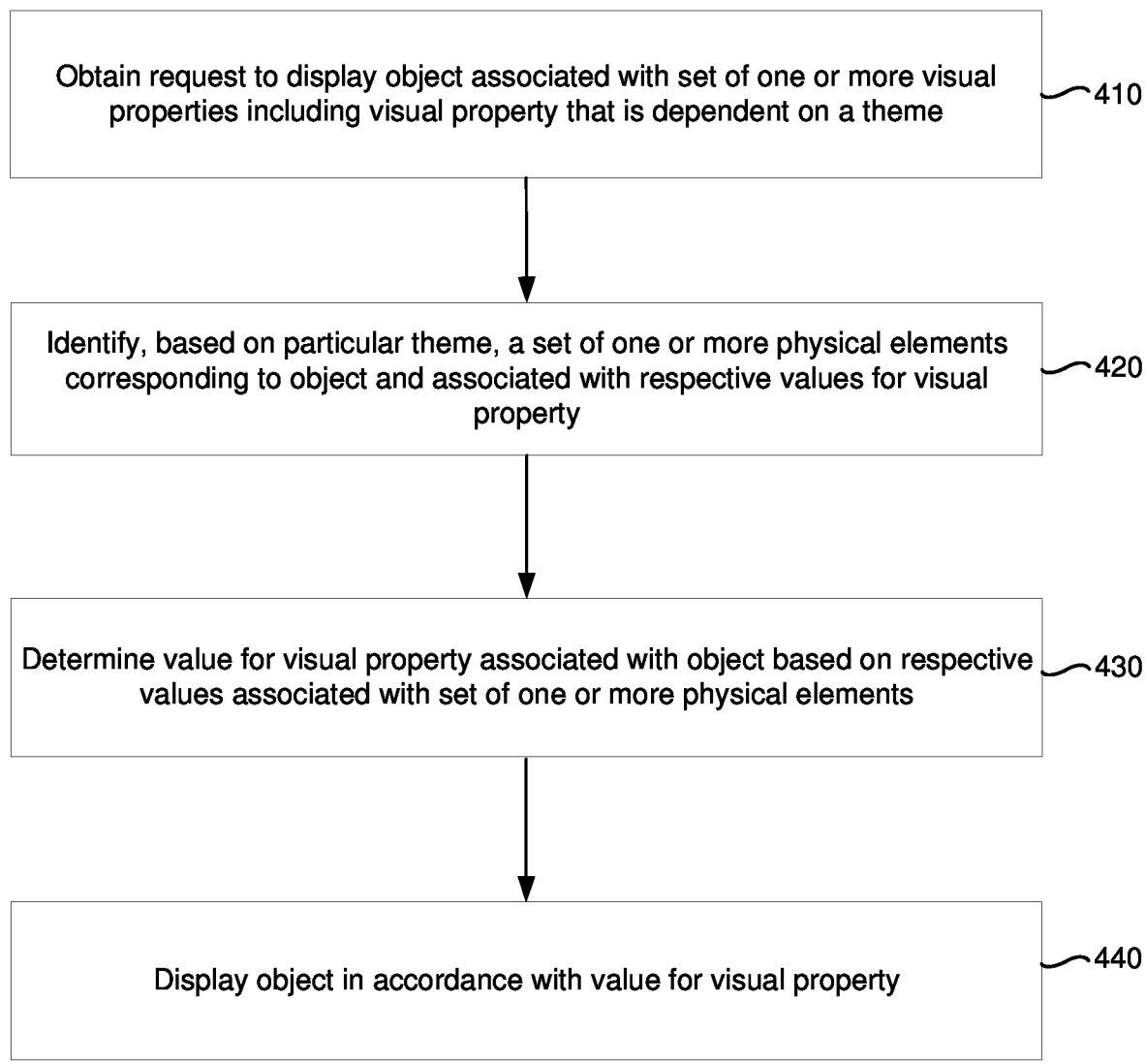
FIGS. 4A-4C are flowchart representations of a method for modifying a visual property of an object based on a geographic location associated with a device in accordance with some implementations.
Figure 4B:
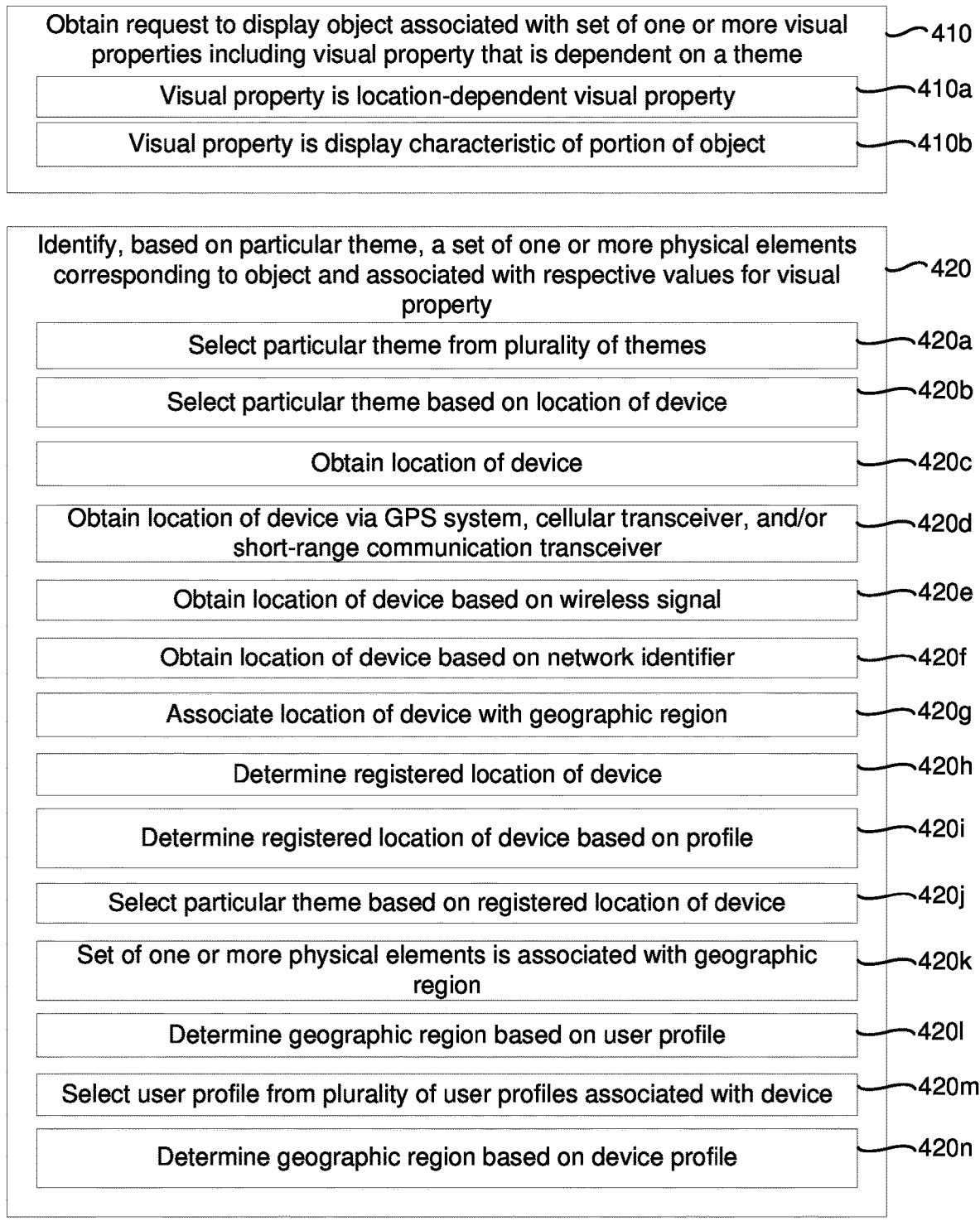
Figure 4C:
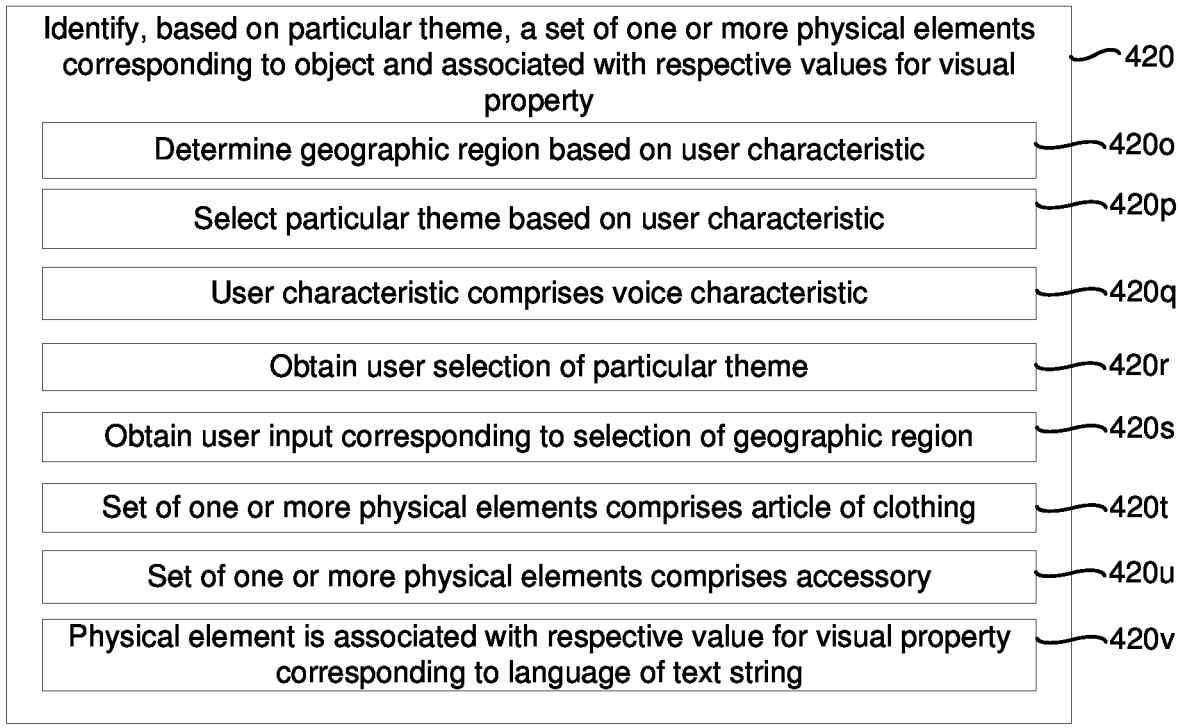
Figure 4C:
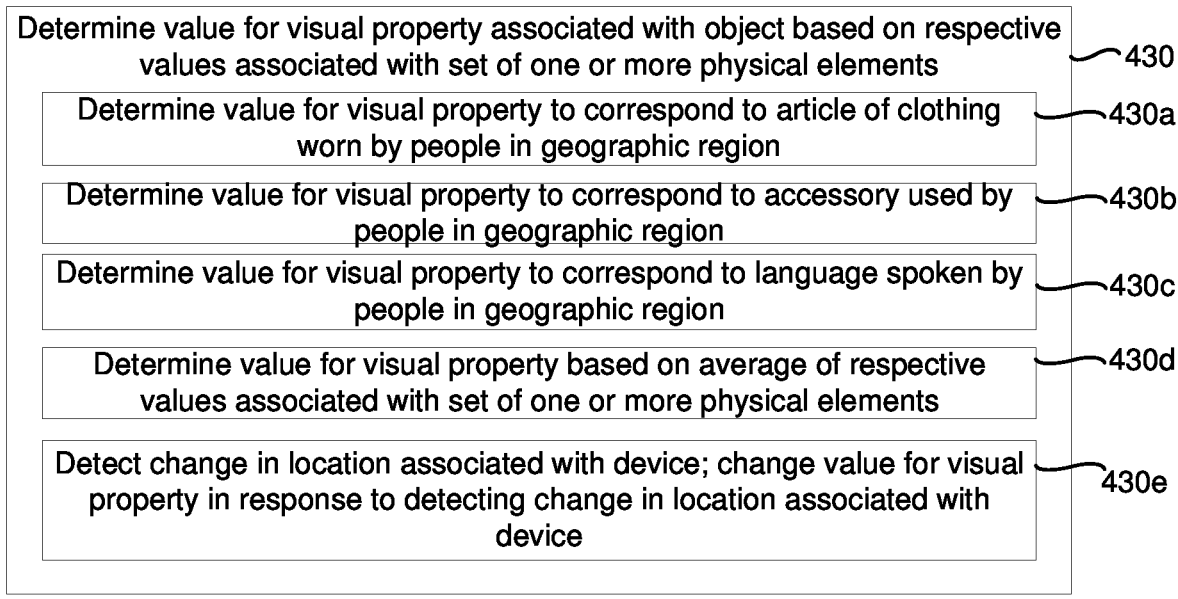

FIGS. 4A-4C are a flowchart representation of a method 400 for modifying a visual property of an object based on a geographic location associated with a device, according to various implementations. In various implementations, the method 400 is performed by a device (e.g., the system 200 shown in FIG. 2 and/or the object customization engine 300 shown in FIG. 3). In some implementations, the method 400 is performed by processing logic, including hardware, firmware, software, or a combination thereof. In some implementations, the method 400 is performed by a processor executing code stored in a non-transitory computer-readable medium (e.g., a memory). Briefly, in various implementations, the method 400 includes obtaining a request to display an object that is associated with one or more visual properties including a visual property that is dependent on a theme, identifying a set of physical elements that corresponds to the object based on a particular theme, determining a value for the visual property of the object based on respective values associated with the physical object, and displaying the object in accordance with the value for the visual property.

Referring to FIG. 4A, as represented by block 410, in various implementations, the method 400 includes obtaining a request to display an object that is associated with a set of one or more visual properties that includes a visual property that is dependent on a theme. The visual properties may be dependent on a type of the object. For example, if the object is an XR object representing a person, the object may be associated with visual properties corresponding to articles of clothing and/or accessories that are worn or carried by a person. Examples of visual properties may include, but are not limited to a hat, an upper body article of clothing, a lower body article of clothing, and/or a carried accessory.

Referring to FIG. 4B, in some implementations, as represented by block 410a, the visual property is a location-dependent visual property. For example, the visual property may be an article of clothing or accessory that has a style that is associated with a geographic location or a type of location (e.g., school, place of business, or residence). In some implementations, as represented by block 410b, the visual property is a display characteristic of a portion of the object. For example, if the object is a virtual person, the visual property may be a display characteristic of the virtual person's face.

In various implementations, as represented by block 420, the method 400 includes identifying, based on a particular theme, a set of one or more physical elements that corresponds to the object. The set of one or more physical elements is associated with respective values for the visual property.

In some implementations, as represented by block 420a, the particular theme may be selected from a plurality of themes. For example, a datastore may store themes that correspond to different geographic regions or different types of locations (e.g., one theme for a school location, another theme for a work location, and still another theme for a home location).

As represented by block 420b, the particular theme may be selected based on a location of the device. In some implementations, the particular theme is selected based on a current location of the device. As represented by block 420c, the method 400 may include obtaining the location of the device. For example, as represented by block 420d, the location of the device may be obtained via a global positioning system (GPS) transceiver, a cellular transceiver, and/or a short-range communication transceiver. In some implementations, as represented by block 420e, the location of the device may be obtained based on a wireless signal. For example, a wireless signal may identify or be associated with a cellular network. The identity of the cellular network may be used to determine the location of the device, e.g., a country in which the device is operating. In some implementations, as represented by block 420f, the location of the device may be obtained based on an identifier from a network, such as an Internet Protocol (IP) address. As represented by block 420g, in some implementations, the location of the device is associated with a geographic region, such as a country, state, or province. The particular theme may be selected based on the associated geographic location. In some implementations, the particular theme may be selected based on a type of location, such as a school, a place of business, or a residence.

As represented by block 420h, in some implementations, the method 400 includes determining a registered location of the device, which may be the same as or different from the current location of the device. In some implementations, as represented by block 420i, the registered location of the device may be determined based on a profile. The profile may be stored on the device. In some implementations, the profile is stored in a network and is associated with the device.

In some implementations, as represented by block 420j, the particular theme is selected based on the registered location of the device. The registered location of the device may be independent of the current location of the device. For example, a device that is registered to the United States may remain registered to the United States even if the user travels to another country.

In some implementations, as represented by block 420k, the set of one or more physical elements is associated with a geographic region. For example, for a particular theme corresponding to a first geographic region, the set of one or more physical elements may include a hooded sweatshirt and a baseball cap. For a particular theme corresponding to a second geographic region, the set of one or more physical elements may include a blazer and a fedora.

In some implementations, as represented by block 420l, the geographic region is determined based on a user profile, which may be associated with the device and/or with multiple devices. The user profile may be stored on the device or in a network. The device may store multiple user profiles, e.g., corresponding to users associated with different geographic regions. In some implementations, as represented by block 420m, a user may select a user profile from a plurality of user profiles. As represented by block 420n, in some implementations, the geographic region is determined based on a device profile. The device profile may be associated with a particular device, e.g., independently of a particular user. For example, a device profile and a user profile may be associated with different geographic regions. As another example, a device may be associated with multiple user profiles, and a user may be associated with multiple device profiles (e.g., multiple devices).

Referring now to FIG. 4C, the geographic region may be determined based on a user characteristic, as represented by block 420o. As represented by block 420p, the particular theme may be selected based on the user characteristic. For example, the particular theme may be selected based on a voice characteristic of the user, as represented by block 420q. In some implementations, the particular corresponding to a geographic region is selected based on an accent detected in the user's voice.

In some implementations, as represented by block 420r, the method 400 includes obtaining a user selection of the particular theme. For example, as represented by block 420s, a user input corresponding to a selection of a geographic region may be obtained. The user may provide the user input using an input device, such as a keyboard, mouse, microphone, image sensor, pen device, and/or a touchscreen interface, e.g., using the display 116 of FIGS. 1A and 1B.

In some implementations, as represented by block 420t, the set of one or more physical elements includes an article of clothing. For example, the set of physical elements may include an upper body article of clothing, such as a shirt or a coat, and/or a lower body article of clothing, such as a skirt or a pair of pants. In some implementations, as represented by block 420u, the set of one or more physical elements includes an accessory. The set of physical elements may include an accessory that is worn, such as a hat or a pair of shoes, and/or an accessory that is carried, such as a bag. In some implementations, as represented by block 420v, the physical element is associated with a respective value for a visual property corresponding to a language of a text string. For example, for a particular style corresponding to a first geographic region, a shirt may include a slogan rendered in a first language. For a particular style corresponding to a second geographic region, the shirt may include the slogan rendered in a second language.

In various implementations, as represented by block 430, the method 400 includes determining a value for the visual property associated with the object based on the respective values associated with the set of one or more physical elements. In various implementations, determining the value for the visual property based on the respective values associated with the set of one or more physical elements allows the device to automatically customize the object. In some implementations, automatically customizing the object reduces the need for user inputs corresponding to manual customization of the object. In some implementations, reducing the need for user inputs tends to prolong a battery life of a battery-operated device, thereby enhancing operability of the device.

As represented by block 430a, a value for the visual property is determined that corresponds to an article of clothing that is worn by people in the geographic region. For a particular theme corresponding to a first geographic region, for example, a value that corresponds to a hooded sweatshirt may be selected. For a particular theme corresponding to a second geographic region, a value for the visual property that corresponds to a blazer may be selected. In some implementations, setting the value for the visual property to correspond to an article of clothing that is worn by people in the geographic region enhances a user experience provided by the device by presenting objects that are tailored to clothing preferences of the geographic region. In some implementations, customizing the object by selecting virtual clothing articles based on the geographic region associated with the device reduces the need for a user to manually select virtual clothing articles for the object.

In some implementations, as represented by block 430b, a value for the visual property is determined that corresponds to an accessory that is used by people in the geographic region. For a particular theme corresponding to a first geographic region, for example, a value that corresponds to a baseball cap may be selected. For a particular theme corresponding to a second geographic region, a value that corresponds to a fedora may be selected. Determining the value for the visual property that corresponds to an accessory used by people in the geographic region allows the device to automatically customize the object, potentially reducing the need for user inputs corresponding to manual customization of the object. In some implementations, reducing the need for user inputs tends to prolong a battery life of a battery-operated device, thereby enhancing operability of the device.

In some implementations, as represented by block 430c, a value for the visual property is determined that corresponds to a language that is spoken in the geographic region. For a particular theme corresponding to a first geographic region, for example, a value for the visual property that corresponds to a shirt with a slogan rendered in a first language may be selected. For a particular theme corresponding to a second geographic region, a value for the visual property that corresponds to the shirt with the slogan rendered in a second language may be selected. Determining the value for the visual property based on a language spoken in the geographic region allows the device to automatically customize the object, potentially reducing the need for user inputs corresponding to manual customization of the object. In some implementations, reducing the need for user inputs tends to prolong a battery life of a battery-operated device, thereby enhancing operability of the device.

In some implementations, as represented by block 430d, a value for the visual property is determined based on an average of respective values associated with the set of one or more physical elements. For example, if the set of one or more physical elements represents a collection of hats, a value representing an "average" or "typical" hat may be selected. Setting the value for the visual property based on an average of respective values associated with the set of one or more physical elements may enhance a user experience provided by the device by presenting objects that are tailored to representative examples of physical elements. In some implementations, customizing the object based on an average of respective values associated with the set of one or more physical elements reduces the need for a user to manually select a value for the visual property.

In some implementations, as represented by block 430e, the method 400 includes detecting a change in a location associated with the device. When the change in the location associated with the device is detected, the value of the visual property may be changed. For example, a different article of clothing may be applied to an object representing a person when the device enters a different country or becomes associated with a different type of location (e.g., if the device moves from a home location to a work location). Changing the value of the visual property in response to detecting a change in the location associated with the device allows the device to automatically customize the object, potentially reducing the need for user inputs corresponding to manual customization of the object. In some implementations, reducing the need for user inputs tends to prolong a battery life of a battery-operated device, thereby enhancing operability of the device.

In various implementations, as represented by block 440, the method 400 includes displaying the object in accordance with the value for the visual property. For example, a customized object with the selected value for the visual property may be outputted to a display, which may then display the customized object. In some implementations, the display is integrated into the electronic device 104. In some implementations, the display is an accessory device (e.g., an external display) that is in communication with the controller 102 and/or the electronic device 104 via a wired or wireless connection.

Figure 5:
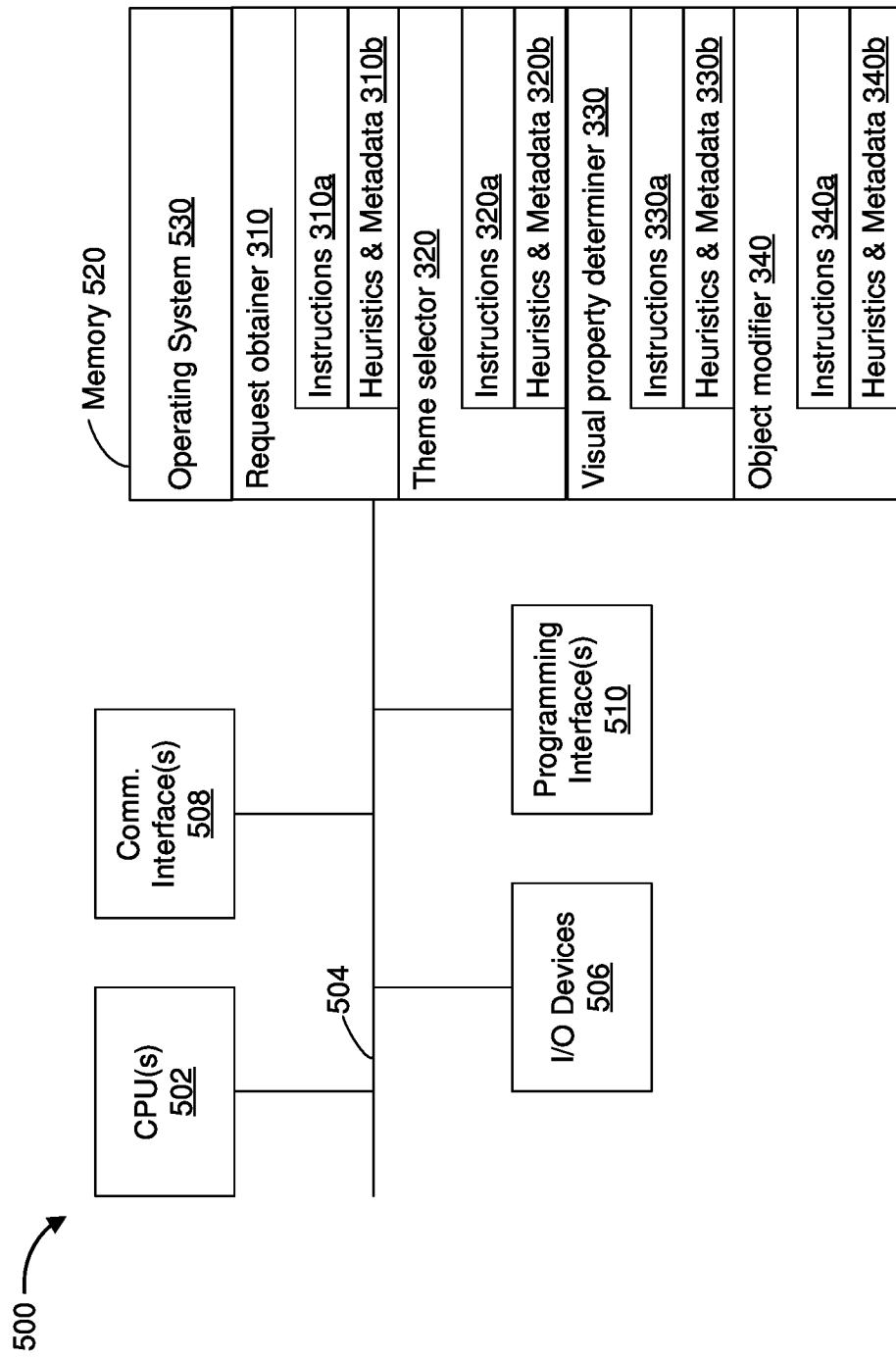
FIG. 5 is a block diagram of a device in accordance with some implementations.

FIG. 5 is a block diagram of a device 500 enabled with one or more components of a device (e.g., controller 102 and/or the electronic device 104 shown in FIG. 1A) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 500 includes one or more processing units (CPUs) 502, one or more input/output (I/O) devices 506 (e.g., the display 112 and/or the speaker 114 shown in FIG. 1A), one or more communication interface(s) 508, one or more programming interface(s) 510, a memory 520, and one or more communication buses 504 for interconnecting these and various other components.

In some implementations, the communication interface 508 is provided to, among other uses, establish, and maintain a metadata tunnel between a cloud-hosted network management system and at least one private network including one or more compliant devices. In some implementations, the one or more communication buses 504 include circuitry that interconnects and controls communications between system components. The memory 520 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 520 optionally includes one or more storage devices remotely located from the one or more CPUs 502. The memory 520 comprises a non-transitory computer readable storage medium.

In some implementations, the memory 520 or the non-transitory computer readable storage medium of the memory 520 stores the following programs, modules and data structures, or a subset thereof including an optional operating system 530, the request obtainer 310, the theme selector 320, the visual property determiner 330, and the object modifier 340. As described herein, the request obtainer 310 may include instructions 310a and/or heuristics and metadata 310b for obtaining a request to display an object, such as an XR object. As described herein, the theme selector 320 may include instructions 320a and/or heuristics and metadata 320b for selecting a particular theme to apply to the object. As described herein, the visual property determiner 330 may include instructions 330a and/or heuristics and metadata 330b for identifying a set of one or more physical elements that correspond to the object based on the particular theme and determines a value for the visual property associated with the object based on the identified set of one or more physical elements. As described herein, the object modifier 340 may include instructions 340a and/or heuristics and metadata 340b for generating a customized object in accordance with the value for the visual property.

It will be appreciated that FIG. 5 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 5 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:
at a device including a display, a non-transitory memory, and one or more processors coupled with the non-transitory memory:
obtaining a request to display an avatar that is associated with a set of one or more visual properties including a visual property that is dependent on a theme;
identifying, based on a particular theme, a set of one or more physical appearance elements for the avatar, wherein the set of one or more physical appearance elements is associated with respective values for the visual property;
modifying a value for the visual property associated with the avatar based on the respective values associated with the set of one or more physical appearance elements; and
displaying the avatar in accordance with the value for the visual property.

2. The method of claim 1, wherein the visual property is a location-dependent visual property.

3. The method of claim 1, wherein the visual property is a display characteristic of a portion of the avatar.

4. The method of claim 1, further comprising selecting the particular theme from a plurality of themes.

5. The method of claim 1, further comprising selecting the particular theme based on a location of the device.

6. The method of claim 5, further comprising obtaining the location of the device.

7. The method of claim 6, further comprising obtaining the location of the device via at least one of a Global Positioning System (GPS) transceiver, a cellular transceiver, or a short-range communication transceiver.

8. The method of claim 6, further comprising obtaining the location of the device based on a wireless signal.

9. The method of claim 6, further comprising obtaining the location of the device based on a network identifier.

10. The method of claim 5, further comprising associating the location of the device with a geographic region.

11. The method of claim 1, further comprising determining a registered location of the device.

12. The method of claim 11, further comprising determining the registered location of the device based on a profile.

13. The method of claim 11, further comprising selecting the particular theme based on the registered location of the device.

14. The method of claim 1, wherein the set of one or more physical appearance elements is associated with a geographic region.

15. The method of claim 14, further comprising determining the geographic region based on a user profile.

16. The method of claim 15, further comprising selecting the user profile from a plurality of user profiles associated with the device.

17. The method of claim 14, further comprising determining the geographic region based on a device profile.

18. The method of claim 14, further comprising determining the geographic region based on a user characteristic.

19. A device comprising:
one or more processors;
a non-transitory memory; and
one or more programs stored in the non-transitory memory, which, when executed by the one or more processors, cause the device to:
   obtain a request to display an avatar that is associated with a set of one or more visual properties including a visual property that is dependent on a theme;
   identify, based on a particular theme, a set of one or more physical appearance elements for the avatar, wherein the set of one or more physical appearance elements is associated with respective values for the visual property;
   modify a value for the visual property associated with the avatar based on the respective values associated with the set of one or more physical appearance elements; and
   display the avatar in accordance with the value for the visual property.

20. The device of claim 19, wherein the visual property is a location-dependent visual property.

21. The device of claim 19, wherein the one or more programs further cause the device to select the particular theme based on a location of the device.

22. The device of claim 19, wherein the set of one or more physical appearance elements is associated with a geographic region determined based on at least one of a user profile, a device profile, or a user characteristic.

23. A non-transitory memory storing one or more programs, which, when executed by one or more processors of a device, cause the device to:
   obtain a request to display an avatar that is associated with a set of one or more visual properties including a visual property that is dependent on a theme;
   identify, based on a particular theme, a set of one or more physical appearance elements for the avatar, wherein the set of one or more physical appearance elements is associated with respective values for the visual property;
   modify a value for the visual property associated with the avatar based on the respective values associated with the set of one or more physical appearance elements; and
   display the avatar in accordance with the value for the visual property.

24. The non-transitory memory of claim 23, wherein the visual property is a location-dependent visual property.

25. The non-transitory memory of claim 23, wherein the one or more programs further cause the device to select the particular theme based on a location of the device.

26. The non-transitory memory of claim 23, wherein the set of one or more physical appearance elements is associated with a geographic region determined based on at least one of a user profile, a device profile, or a user characteristic.

* * * * *